United States Patent
Gotheil-Yelle et al.

(10) Patent No.: US 9,939,866 B2
(45) Date of Patent: *Apr. 10, 2018

(54) OPERATING SYSTEM CONTROL FOR POWER SOURCE

(71) Applicant: Deborah DePaoli

(72) Inventors: Scott Gotheil-Yelle, Stratford, CT (US); Thomas M. DePaoli, Stratford, CT (US)

(73) Assignee: URIPP LLC, Stratford, CT (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/720,185

(22) Filed: May 22, 2015

(65) Prior Publication Data

US 2015/0323972 A1    Nov. 12, 2015

Related U.S. Application Data

(60) Provisional application No. 62/001,857, filed on May 22, 2014.

(51) Int. Cl.
| | |
|---|---|
| *G06F 1/00* | (2006.01) |
| *G06F 1/28* | (2006.01) |
| *G06F 11/07* | (2006.01) |
| *G05B 23/02* | (2006.01) |

(52) U.S. Cl.
CPC ............ *G06F 1/28* (2013.01); *G05B 23/0294* (2013.01); *G06F 11/079* (2013.01); *G06F 11/0721* (2013.01)

(58) Field of Classification Search
None
See application file for complete search history.

(56) References Cited

U.S. PATENT DOCUMENTS

| | | | | |
|---|---|---|---|---|
| 2003/0090164 A1* | 5/2003 | Brosnihan | ............... | H02K 9/10 310/55 |
| 2003/0204756 A1* | 10/2003 | Ransom | ................. | G01D 4/004 713/300 |
| 2009/0091956 A1* | 4/2009 | Nocentini | ............. | H02M 3/156 363/65 |

(Continued)

FOREIGN PATENT DOCUMENTS

| | | |
|---|---|---|
| DE | 102009025887 | 1/2011 |
| EP | 2199431 | 6/2010 |

(Continued)

*Primary Examiner* — Nitin Patel
(74) *Attorney, Agent, or Firm* — DeLio, Peterson & Curcio LLC; Kelly M. Nowak

(57) ABSTRACT

Systems, operations, management and monitoring of controlling and managing power source performance by providing an operating power source device and providing one or more sensors to monitor operation of the power source device. Operational data of the power source device is collected via the one or more sensors and stored to both a local and remote database. The collected operational data is analyzed to detect and identify any operational errors of the power source device, as well as obtaining external and/or internal operating conditions of the operating power source device. Any identified operational errors of the power source device are corrected for using at least the external and/or internal operating conditions.

20 Claims, 13 Drawing Sheets

(56) References Cited

U.S. PATENT DOCUMENTS

| | | | | |
|---|---|---|---|---|
| 2012/0025616 A1* | 2/2012 | Hock | .................. | H02J 9/061 307/66 |
| 2013/0149626 A1* | 6/2013 | Braithwaite | ...... | H01M 8/04089 429/444 |
| 2014/0263261 A1* | 9/2014 | Hunt | .................. | F24J 3/00 219/201 |
| 2015/0143806 A1* | 5/2015 | Friesth | .................. | F01K 3/00 60/517 |

FOREIGN PATENT DOCUMENTS

| | | |
|---|---|---|
| JP | 1993027062 | 2/1993 |
| JP | 1994247701 | 9/1994 |
| JP | 2008013821 | 1/2008 |
| JP | 201053384 | 3/2010 |
| JP | 2010133026 | 6/2010 |

\* cited by examiner

OPERATING SYSTEM CONTROL FOR POWER SOURCE

PRIORITY

This application claims priority of U.S. Provisional Application Ser. No. 62/001,857 filed on May 22, 2014.

BACKGROUND OF THE INVENTION

1. Field of the Invention

The present invention relates to power source control systems, and in particular, operation, management and monitoring for implementation of a hydrogen gas generator system and additional related implementation systems.

2. Description of Related Art

Power supply and source operating systems, such as generators, utilize various power supplies and resources for power generation. For instance, hydrogen generators utilize hydrocarbon containing fluids to produce a mixture of hydrogen ($H_2$) and oxygen ($O_2$) gases, typically in a 2:1 molar ratio, the same proportion as water. While many power supply and source systems operate smoothly through normal use and operation, over time these systems typically deteriorate. Routine maintenance is required to keep such systems operating smoothly and efficiently.

A conventional approach for maintaining power supply and source systems is through periodically scheduled maintenance and/or cleaning procedures. However, a system may fail or not work efficiently during these intervals of routine maintenance and/or cleaning. This often leads to parts, or even entire systems, needing repair and/or replacement. Also, decreased operating efficiency of the power supply systems leads to less efficient use of energy resources, increased costs and increased wear and tear on the systems themselves.

Accordingly, needs continue to exist in the art for improved systems, operations, management and monitoring of power supply systems that enable the power supply systems to run smoothly, efficiently, at reduced costs, and provide reduced intervals of required maintenance and/or cleaning.

SUMMARY OF THE INVENTION

Bearing in mind the problems and deficiencies of the prior art, it is therefore an object of the present invention to provide a systems, operations, management and monitoring of power supply systems that enable the power supply systems to run smoothly, efficiently, at reduced costs, and provide reduced intervals of required maintenance and/or cleaning.

Still other objects and advantages of the invention will in part be obvious and will in part be apparent from the specification.

The above and other objects, which will be apparent to those skilled in the art, are achieved in the present invention which is directed to computer-implemented methods of controlling and managing power source performance by providing an operating power source device and providing one or more sensors to monitor operation of the power source device. Operational data of the power source device is collected via the one or more sensors and stored to both a local and remote database. The collected operational data is analyzed to detect and identify any operational errors of the power source device, as well as obtaining external and/or internal operating conditions of the operating power source device. Any identified operational errors of the power source device are corrected for using at least the external and/or internal operating conditions.

The methods may further include providing a mobile device having geotagging, bluetooth, wireless/wifi and subscriber identity module (SIM), and receiving at the mobile device the identified operational errors of the power source device. An operations management source not located in the vicinity of the power source device locates and identifies the power source device via the geotagging of the mobile device. Operational information is then communicated via email, short message service (SMS) and multimedia messaging service (MMS), followed by remotely correcting the identified operational errors of the power source device via the operations management source. The identified operational errors may be corrected remotely using the mobile device, or other similar management device (note at top), as a data transfer component for automatically adjusting the identified operational errors.

In accordance with the various embodiments of the invention the operating power source device may be a generator including a hydrogen gas generator, diesel operated generator, a natural gas generator, an electrical generator, or even combinations thereof. The operating power source device may also be a battery backup system. Operational data that may be corrected for includes, but is not limited to, temperature, runtime, pressure, voltage, flow rate, audio/sound, vibration, thermal conditions and the like. The one or more sensors may be one or more thermal imaging sensors, imaging devices and/or imaging camera.

In various other embodiments the invention is also directed to non-transitory computer program products and computer systems all for controlling and managing performance of an operating power source device having one or more sensors monitoring operation thereof. Various of the steps in accordance with invention may be implemented in a cloud-computing environment.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIGS. 6A-6D are exemplary thermal imaging of a circuit board with overlaid grid temperature recognition with heat scale showing the thermopile integration thereof on a mobile device in accordance with the one or more embodiments of the invention.

DESCRIPTION OF THE PREFERRED EMBODIMENT(S)

In describing the preferred embodiment of the present invention, reference will be made herein to FIGS. 1-12 of the drawings in which like numerals refer to like features of the invention.

In accordance with the various embodiments, the present inventions are directed to optimal operation of a power source by controlling and managing the performance thereof. For instance, implementation of a hydrogen gas generator device requires multiple systems to communicate to ensure optimal operation. While aspects of the present invention have been described in relation to a hydrogen gas generator, it should be appreciated and understood that the various embodiments of the invention are directed to and applicable with any type of power source, or power supply and source operating systems.

Figure 1:
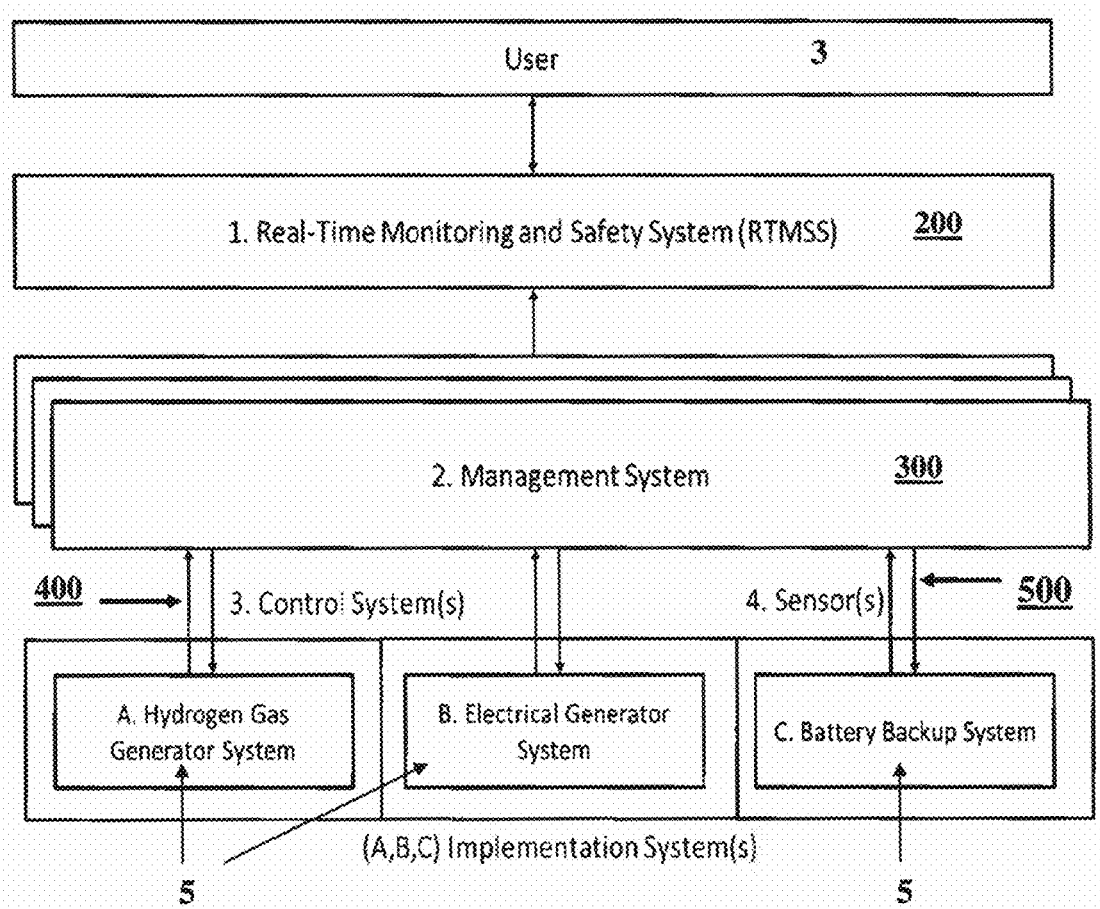
FIG. 1 is a flow chart showing component implementation systems in accordance with the various embodiments of the invention.

Referring to FIG. 1, the multiple systems of the invention that power sources use for optimal operation include, but are not limited to, a real-time monitoring and safety system 200 (also referred to herein as monitoring systems 200), a management system 300, a control system 400, and a sensor system 500. By maintaining a constant connection between these systems of the invention, operation of various types of power sources (also referred to herein as "implementation systems 5") may be properly managed either manually by a user 3 or automatically using set, or predetermined, standard and advanced operation parameters. In accordance with the invention, power source/implementation systems 5 suitable for use with the invention include, but are not limited to, hydrogen generator devices, electrical generators, battery backup systems, and even combinations thereof. For instance, a suitable hydrogen generator device may include the hydrogen generator devices disclosed in U.S. Pat. No. 8,591,707, which is hereby incorporated by reference in its entirety.

In the invention operational data is collected and transferred from various sensors 500 connected to each of the implementation systems 5. These may include (but are not limited to) temperature, runtime, pressure, voltage, flow rate, and combinations thereof. Each implementation system 5 has its own unique operation parameter limits, high and low, to ensure optimal operation. Standard and advanced operation parameters may be recorded and stored within internal and external databases, referred to herein as data. This recorded variable data is analyzed to identify possible issues with each implementation system 5 during operation, or to identify why such a system 5 has halted operation.

It should be appreciated and understood that each implementation system. 5 (i.e., the hydrogen generator device, electrical generator, and/or battery backup system) utilizes its own individual control system 400 that is directed by commands initiated by the management system 300. Calculations are performed using the sensor 500 variables followed by adjusting runtime environment to ensure optimal operation. Computer and microcontroller based hardware units, as discussed further below, manage the monitoring systems 200 and management systems 300. Optionally, secondary and/or backup units may be provided as redundant failsafe units that may be utilized to ensure continued operation of the systems if the primary unit was to malfunction Referring to FIG. 2, the real-time monitoring and safety systems 200 of the invention are disclosed and shown in more detail. In accordance with one or more embodiments the real-time monitoring and safety system (also referred to herein as RTMSS) includes single or multi-board computer hardware. For instance, this hardware may include, but is not limited to, a central processing unit (CPU)/graphics processing unit (GPU) and/or advanced processing unit (APU which is CPU and GPU combined on a single chip), random access memory (RAM), removable hard disk drive (HDD), network interface controller (NIC) (either wireless or wired or both), global system for mobile communications (GSM), wireless network routing capabilities/wireless access point, subscriber identity module (SIM) and general input/output (I/O) capabilities.

Figure 2:
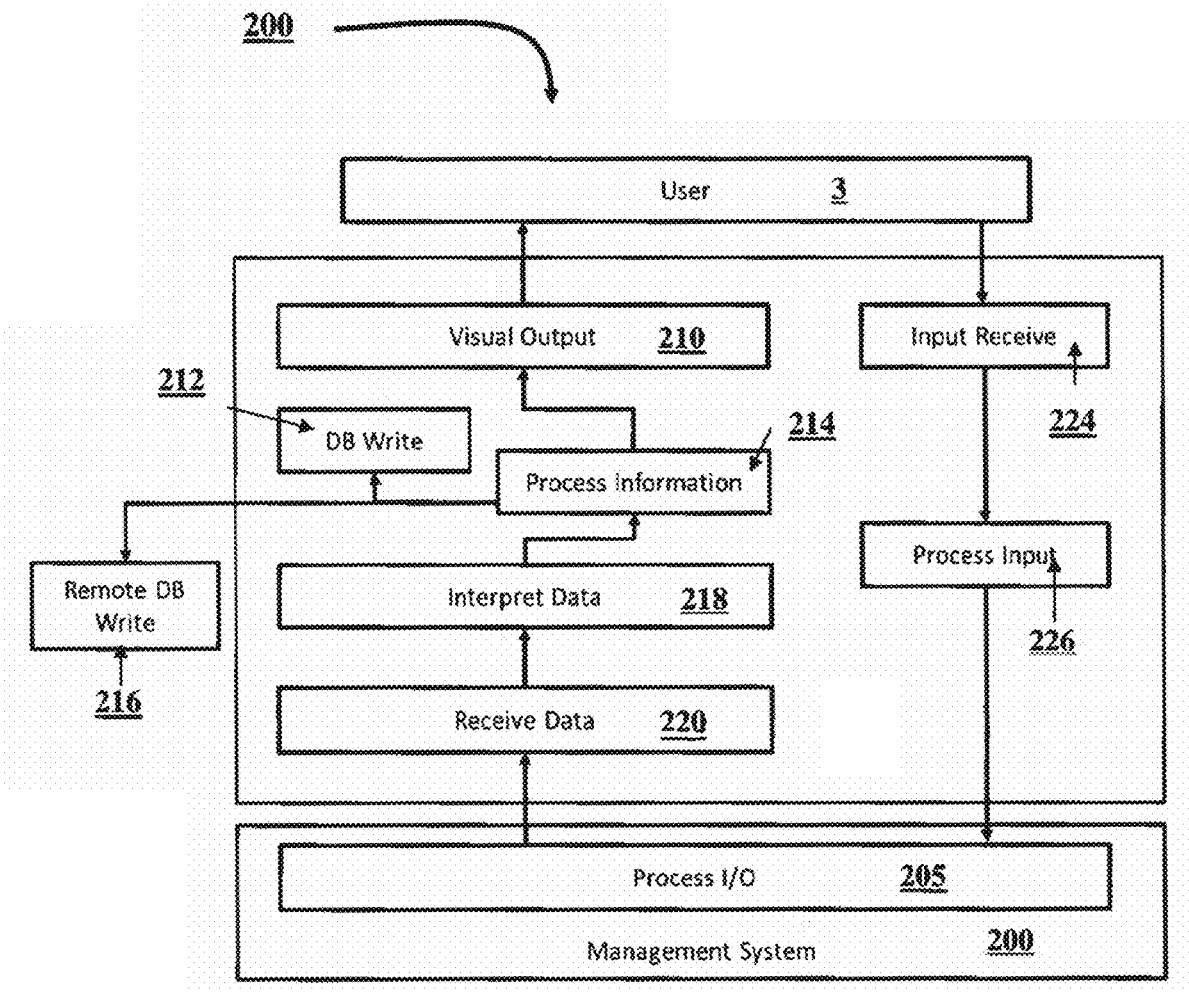
FIG. 2 is a flow chart showing real-time monitoring and safety systems of FIG. 1 in accordance with the one or more embodiments of the invention.

The real-time monitoring and safety systems 200 shown in FIG. 2 includes a number of different components and steps working in conjunction with one another. In the invention at step 224 a user 3 (i.e., human) is able to access, retrieve, interact with, and input instructions to the monitoring system 200. Through interaction with the monitoring system 200, it should be appreciated that the user is also ultimately able to access, retrieve, interact with, and input instructions to the management system 300, control system 400, and/or sensor system 500.

In interacting with the user 3, the real-time monitoring and safety system 200 may run an operating system (OS) with a graphic user interface (GUI). These operating system (OS) may include, but are not limited to, Linux, OSX, Microsoft Windows, Android, etc. Data passed from sensors 500 to the management system 300 is converted into a readable format, referred to as information, and displayed on a visual output device 210 (example: LED, LCD, etc.) in step 210. This visual output device 210 is able to be viewed and accessed locally by the user to provide the user 3 with updates on system operation and alerts the user of any unusual activity. These updates may be for the entire power system, each of the individual power sources of the monitoring systems 200, management system 300, control system 400, sensor system 500, or combinations thereof.

In the invention, proprietary or multi-platform software may be implemented. The multi-platform may include, but is not limited to, Java, JavaScript, PHP, Python, etc. The retrieved data is displayed locally to the user 3 to show the current (real-time) runtime condition(s) of each of the implementation system 5 sensors 500 that are connected to the management and implementation systems 300 for ensuring optimal operation of the power source(s).

Process inputs and outputs 305 from the management system 300 are input into the monitoring system 300 as shown in FIG. 2. In this process, the data is received at step 220, interpreted at step 218, processed at step 214, and then written (i.e., saved or recorded) to internal at step 212 or external at step 216 databases, followed by outputting such data for visual display at step 210. In recording the operation data to the internal database 212 and/or external remote database 216, the recorded data may include, for instance, GSM and SIM details such as latitude, longitude and specific subscriber information.

By writing the retrieved, interpreted and processed data to the external database 216, the user 3 is provided with the ability to access historical data via access to a centrally controlled cloud database. This external historical and peak usage data may be analyzed to provide support and/or consultation may be provided to optimize each system usage or the overall power system usage. Additionally, geographic information provided by the global system for mobile communication (GSM) is to predict local weather operation conditions for the various geographic hemispheres and seasons. This is necessary since system operations change as the surrounding environment changes (e.g., temperature, pressure, etc.), which may result in modified maintenance schedules or a change to running operations that may be performed by a local service technician (e.g., hardware based change) or remotely (e.g., software based change).

In accordance with one or more embodiments of the invention, the GSM system may reach out to a centralized support network if system and/or power source operation parameters change drastically. Such drastic changes may indicate an issue with one or more systems of the invention, or of the power source itself. When this occurs a support operator may contact a local service technician who may perform modifications and/or repairs to the specific system and/or power source. Users may also contact the support network to inquire with questions and/or comments about the system via telephone, web form, short message service (SMS), and multimedia message service (MMS).

Questions and responses will be collected and accessible to all users of the system to help streamline question management. Depending on the question or issue, service technicians may support via telephone, local service (house call) or via video chat to guide a user to the proper end result. Optionally, a user will be able to choose whether to monitor energy usage, system operations, or control the management system manually by inputting commands to the monitoring system which are directed to the management system by interacting through a human interface device (HID) (for example: touch, keypad, etc.). For example, if the user wants to shut down the system and/or power source, a terminate command will initiate a specific set of processes to safely shut down the running systems.

Figure 3:
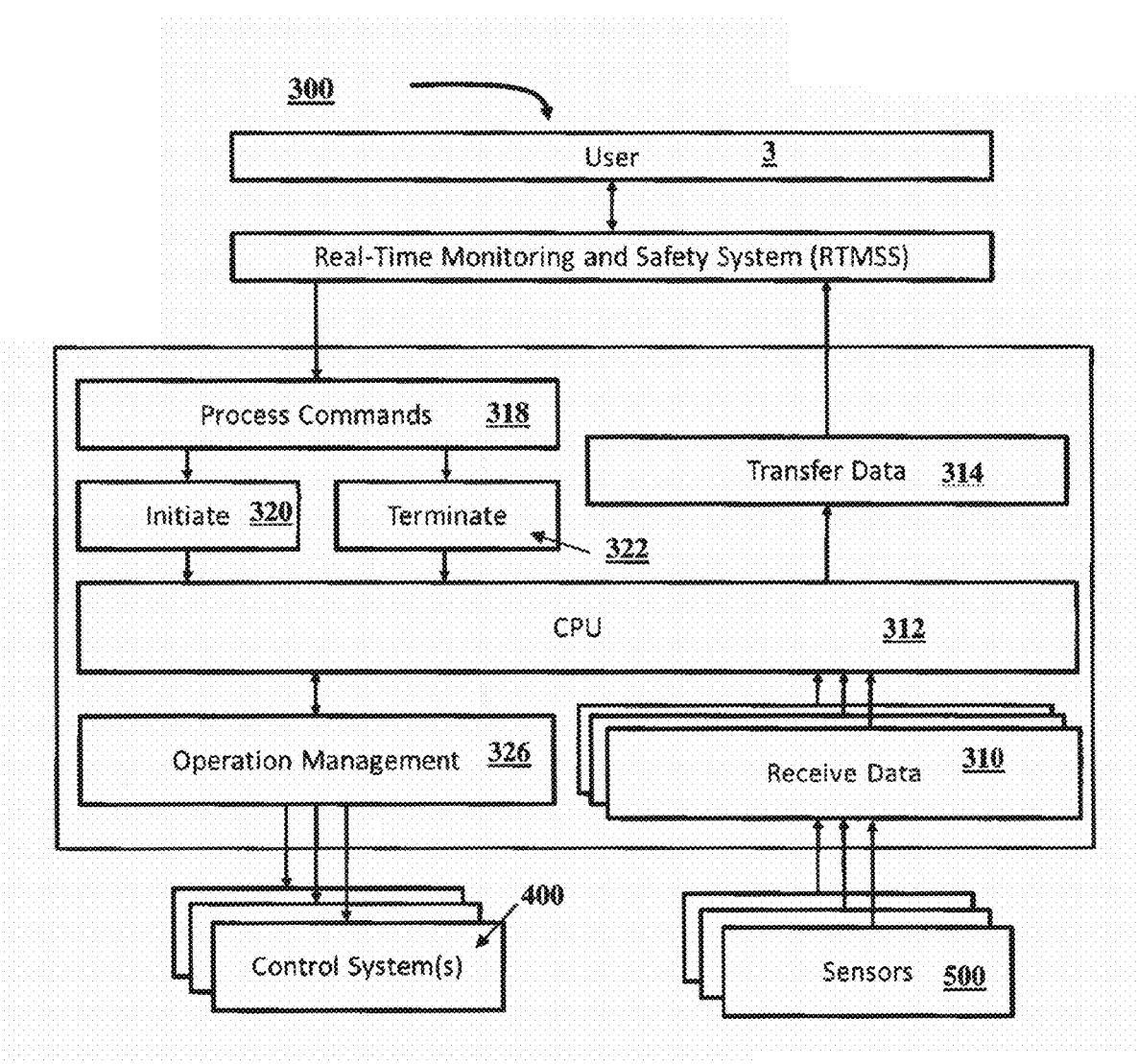
FIG. 3 is a flow chart showing management systems of FIG. 1 in accordance with the various embodiments of the invention.

Referring to FIG. 3, the real-time monitoring and safety system 200 communicates with the management system 300 by retrieving and sending various types of data back and forth to one another. Processed data from the monitoring system 200 is input into the management system 300 at step 226, while data processed in the management system 300 is input into the monitoring system 200 at step 220.

The management system 300 of the invention may include one or more (i.e., a single or multiple) microcontroller based units that are directly connected to the monitoring system 200, control system 400 and sensor system 500, as shown in FIGS. 1 and 3. The input/output process 305 of the management system 300 receives sensor 500 data at step 310, which is sent to the central processing unit (CPU) 312 and transferred to the monitoring system 200 at step 314. The monitoring system 200 inputs process commands to the management system 300 at step 318, which may include initiate commands (step 320) or terminate commands (step 322). These input process commands 320, 322 are input into the CPU and transferred to the operation management at step 326. This operation management both receives and inputs data from/to the CPU 312. Also, the operation management inputs the process command data to the control system 400.

In the various embodiments, the management system 300 runs logic algorithms to interpret the data output from the various sensors 500, and calculate values to manipulate the control systems accordingly. In so doing, this data may be analyzed by one or more microcontrollers to ensure system and/or power source operation parameters are maintained within or at optimal operating thresholds (i.e., within or at optimal or predefined working ranges).

When it is determined that operation parameters fall outside (i.e., exceed or drop below) efficiency thresholds, warning alerts may be sent to the monitoring system to the user. These warnings or alerts inform the user of current working and/or operation conditions that may be less than desirable for optimal working conditions of the power source and its systems. The user may then initiate commands to invoke processing and/or working condition changes in the power source and/or its systems to assist in stabilizing the operation thereof. For example, temperature often increases on a power source comprising a hydrogen gas generator device or system. If it is determined in accordance with the monitoring 200, management 300 and sensor 500 systems of the invention that the temperature begins to approach one of the threshold limits, then commands may be sent to the control system 400 to either shut down or throttle a solenoid valve that controls hydrogen flow to decrease the speed of the rotating assembly to assist in lowering the operating temperature.

Figure 4:
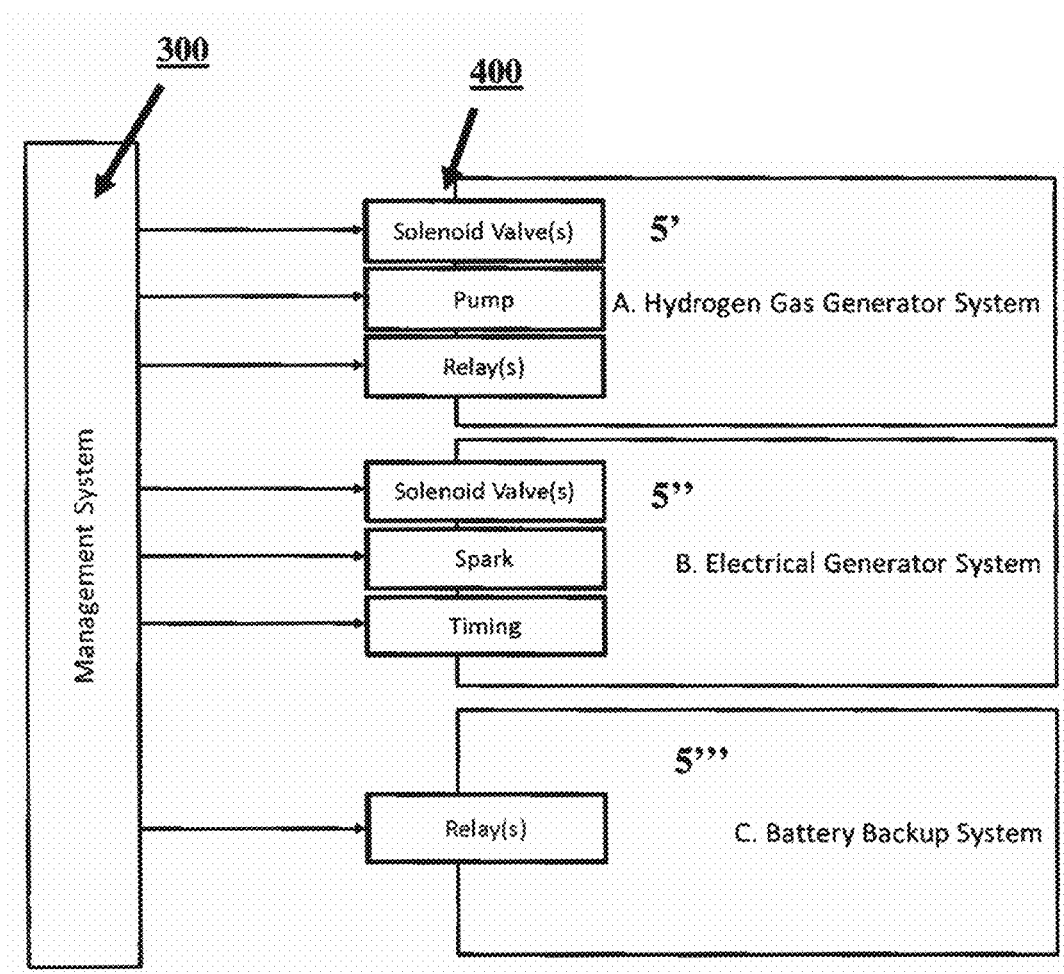
FIG. 4 is a flow chart showing control systems of FIG. 1 in accordance with the one or more embodiments of the invention.

Details of the control system 400 are shown in FIG. 4. The control system is directly connected to and controlled by the management system 300. The individual components in the control system 400 are attached to the implementation systems 5 and will only operate when a set of instructions are passed from the management system 300. Again, the implementation systems 5 may include, but are not limited to, hydrogen generator devices, electrical generators, battery backup systems, and even combinations thereof. Depending on the type of implementation system 5, the components that are controlled in such systems may be different. For instance, controlled components for a hydrogen generator system may include, but are not limited to, solenoid valve(s), pumps, relays, and the like. Controlled components for an electrical generator may include, but are not limited to, solenoid valve(s), sparks, timing, and the like. The controlled components for a battery backup system may include, but are not limited to, relays, solenoids, and the like. Instructions are sent back and forth within the present systems of the invention to directly control and operate these various system components, thereby ultimately controlling and maintaining the power systems/implementation systems 5 themselves.

Figure 5:
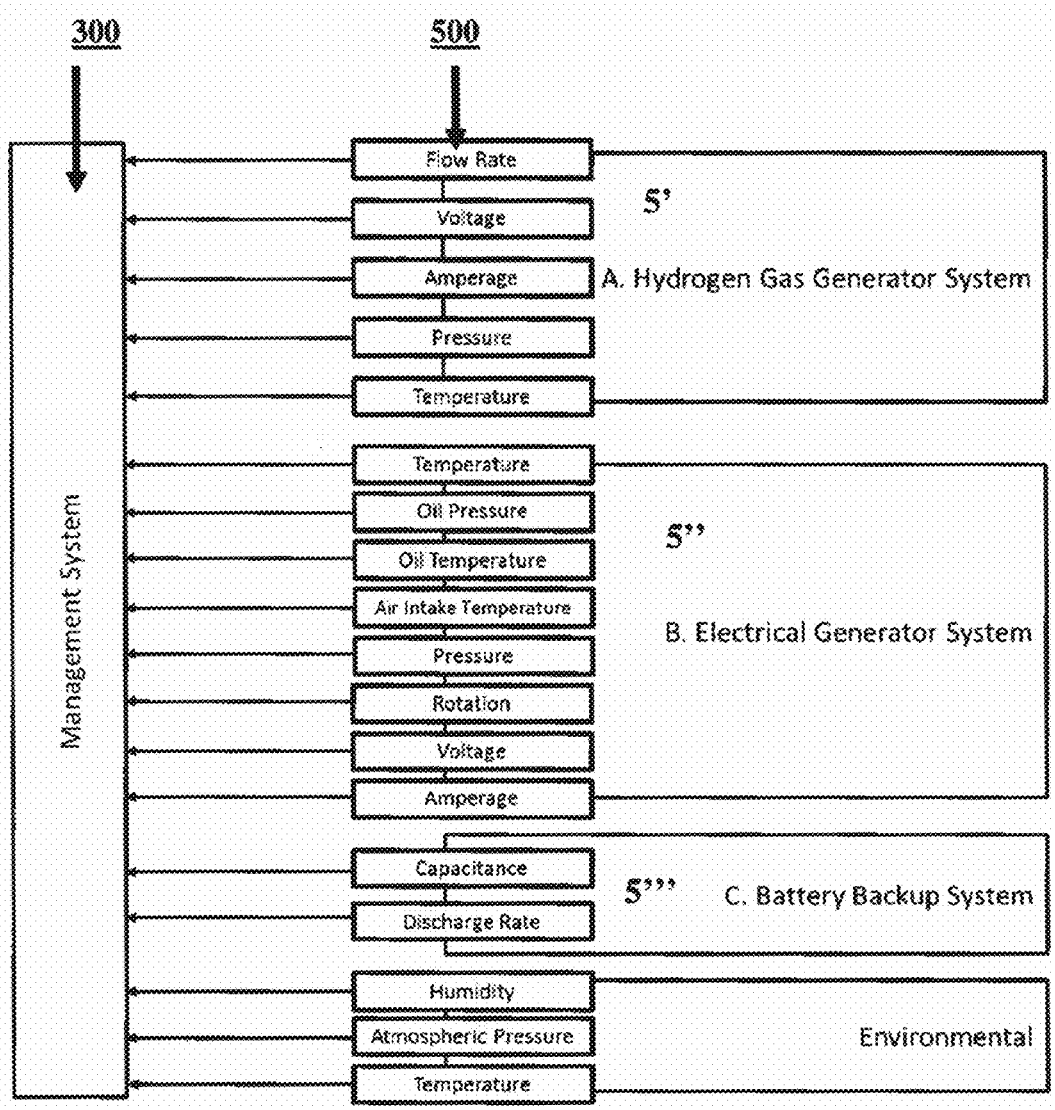
FIG. 5 is a flow chart showing sensor systems of FIG. 1 in accordance with the various embodiments of the invention.

Referring to FIG. 5, in one or more embodiments the various sensors 500 provide guidance on how the control system 400 receives and implements instructions. These sensors 500 are utilized for monitoring and measuring outputs/inputs from various components of the implementation systems 5 that are to be controlled for ultimately controlling and maintaining the implementation systems 5 within predefined or set parameters/thresholds for optimal performance of such systems 5. That is, the sensor system 500 includes a variety of different sensors that measure specific physical attributes of each implementation system 5. These sensors send signals to the management system 300, which in turn, analyzes and evaluates whether the implementation system 5 is operating within the predefined parameters/thresholds for optimal performance thereof.

It should be appreciated and understood that the components to be controlled for each implementation systems 5 will vary. As such, the parameters that each of these controllable components will also vary. For instance, when the implementation system 5 is hydrogen generator system the components to be controlled may adjust parameters including, but not limited to, flow rate, voltage, amperage, pressure, temperature, and the like. Parameters for an electrical generator may include, but are not limited to, temperature, oil pressure, oil temperature, air intake temperature, pressure, rotation, voltage, amperage and the like. Parameters for a battery backup system may include, but are not limited to, capacitance, discharge rate, and the like. Other parameters for the implementation systems 5 also include audio/sound, vibration and thermal conditions.

In accordance with one or more embodiments, environmental factors may also be obtained and analyzed in the invention to control and maintain optimal performance and operation conditions of the power source/implementation systems 5. These external environmental factors may include, but are not limited to, humidity, atmospheric pressure, temperature, and the like. Other external factors may also be taken into consideration alone or with these environmental factors. Such other external factors include, for instance, latitude, longitude, distance above or below sea level, and the like. The systems of the present invention receive these environmental and external factor data for processing thereof to ensure such factors do not deleteriously affect performance or operation of the implementation system 5. If it is determined that these factors may or do have an impact on the performance/operation of the implementation system 5, then the various working components of the individual implementation systems 5 may be adjusted or manipulated to compensate for any such deleteriously affects that the environmental and external factors may have on operation of the system 5.

Figure 6B:
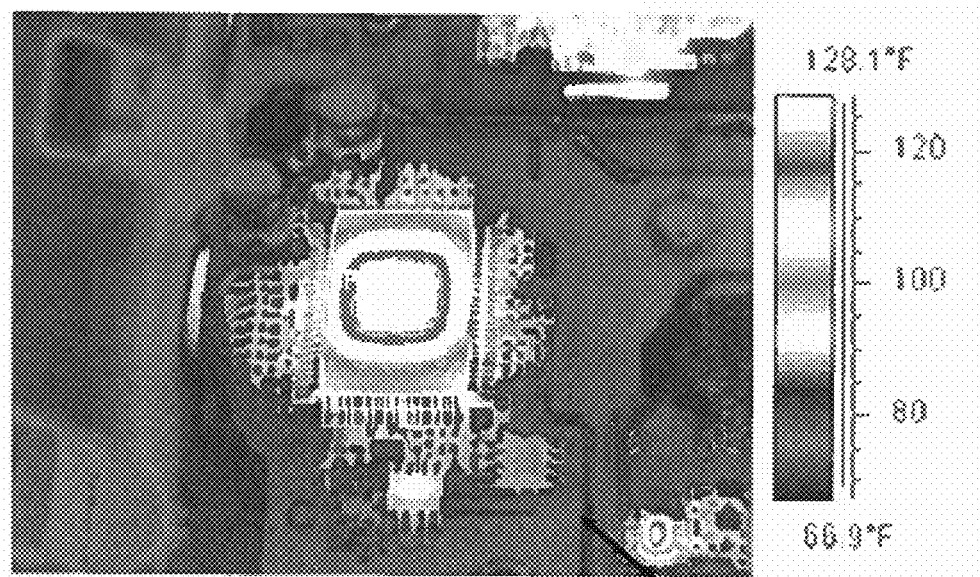
Figure 6B:
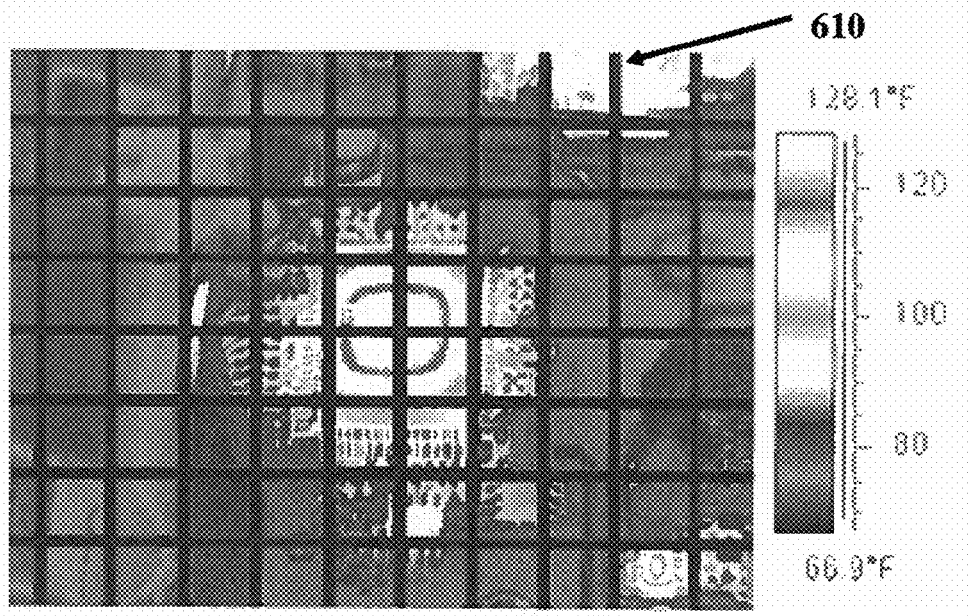
Figure 6C:
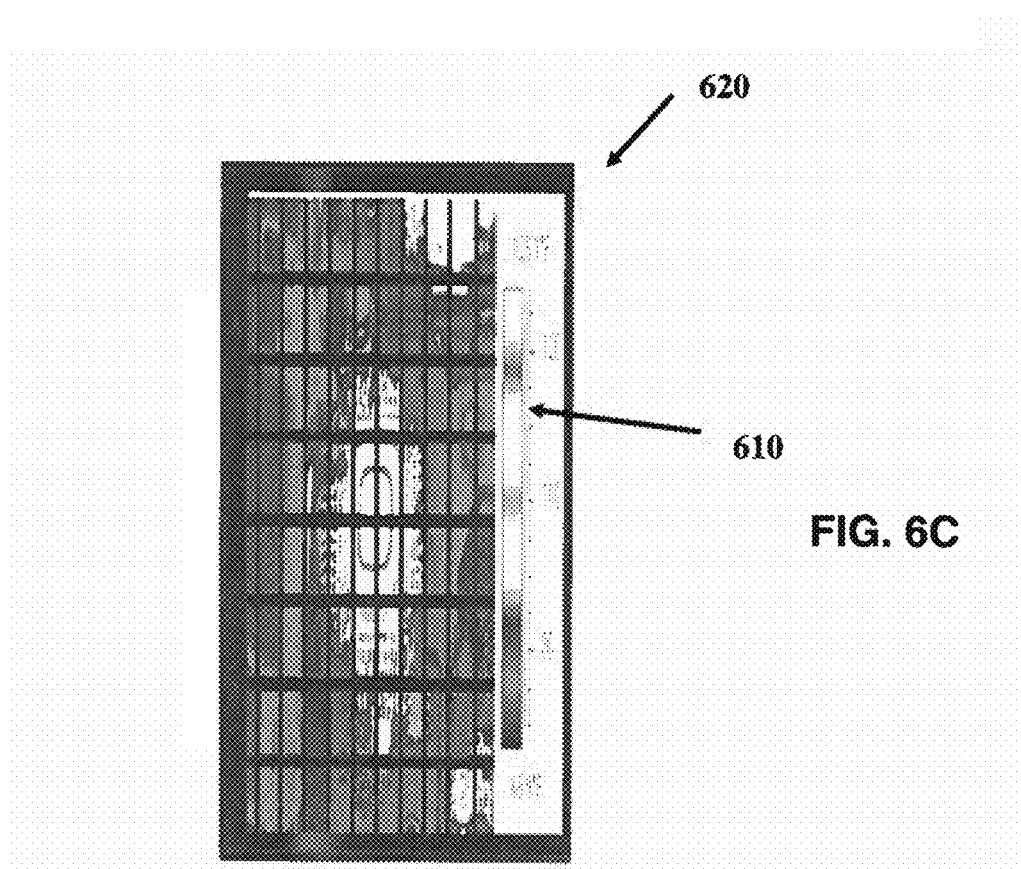
Figure 6D:
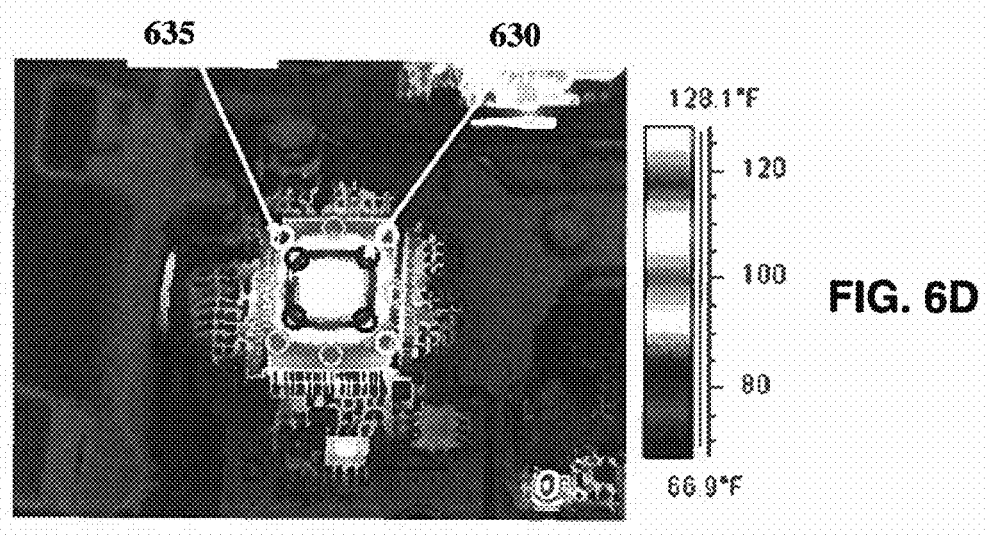

Referring to FIGS. 6A-6D exemplary thermal imaging of a component part of an implementation system 5 is monitored and processed in accordance with the present invention. As shown in FIGS. 6A-6B, a thermal image of a circuit board 600 of a power source 5 is depicted having an overlaid grid plot layout 610 and showing heat scaling. In accordance with the one or more embodiments of the invention as shown in FIG. 6C, a thermopile integration of such thermal imaging is shown on a mobile device 620 for monitoring and controlling one or more component parts of the power source for optimal operation thereof. Referring to FIG. 6D, the thermal positioning is shown with the black rings 630 indicating the outer barrier of the chipset while the white rings 635 indicate that the chip is connected to the circuit board.

Figure 7A:
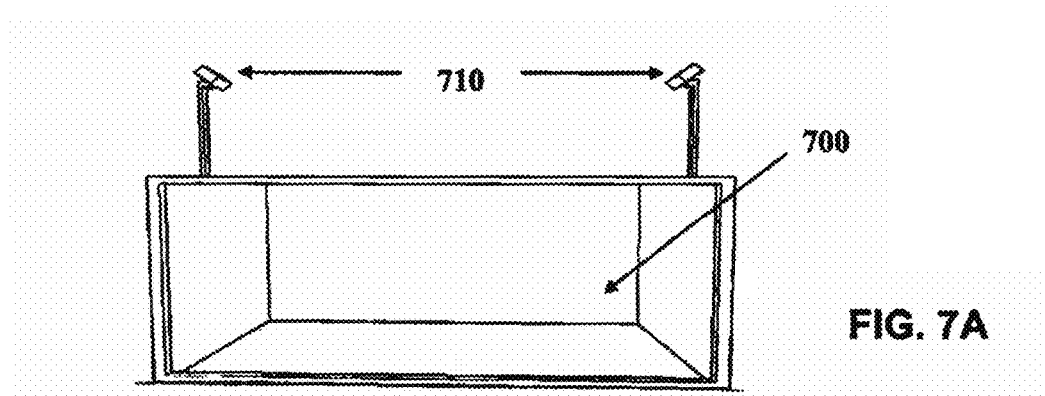
FIGS. 7A-7C depict an enclosure having mounted thermal imaging devices for monitoring and controlling power sources residing therein in accordance with the one or more embodiments of the invention.
Figure 7B:
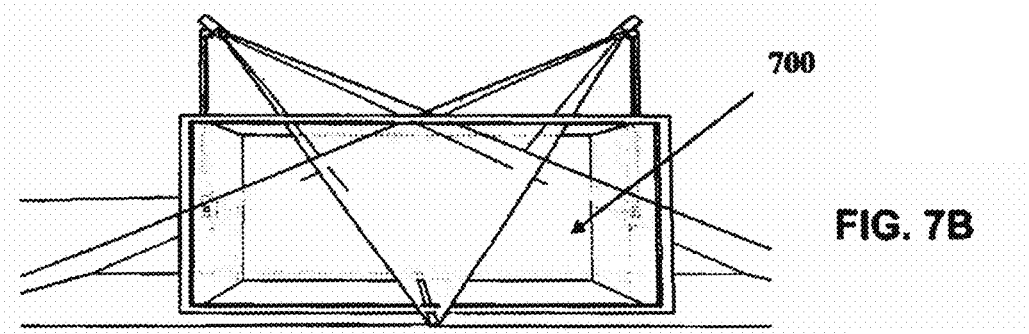
Figure 7C:
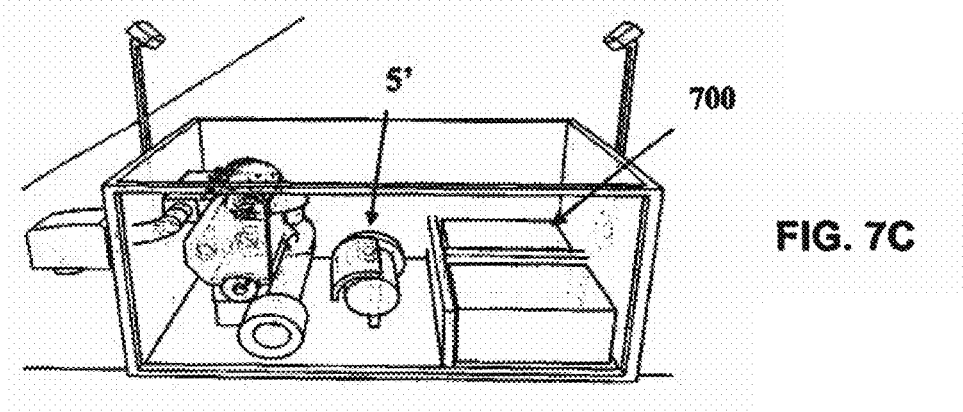

The various methods and systems may be performed within an enclosure as shown in FIGS. 7A-7C where monitoring of one or more implementation systems 5 is being performed therein. An enclosure 700 having mounted imaging or detection devices 710 is shown in FIG. 7A. In one or more embodiments the imaging/detection devices 710 may provide multiple overlapping fields of view of the system(s) 5 residing within the enclosure as shown in FIG. 7B. These systems 5 within the enclosure 700 may include a hydrogen gas generator system, electrical generator system and/or battery backup system.

Again as shown in FIG. 7C, these implementation systems 5 include one or more components parts that are to be controlled, adjusted and/or manipulated in accordance with the invention for optimal operation of such system 5. For instance, the hydrogen gas generator system may include a hydrogen gas generator device, solution reservoir, hydrogen gas flow regulation system and pump. The electrical generator system may include an internal combustion engine and generator head. The battery backup system may include a non-liquid dry cell absorbed glass mat (AGM) type, and relay components.

In accordance with the invention, the thermal grid temperature recognition and enclosure system shown in FIGS. 6A-7C may be used to monitor internal component temperatures within the enclosure 700 using thermal imaging devices 710 and thermal grid temperature recognition 600, 610. The thermal imaging devices, preferably two or more, may be mounted on the enclosure 700 and positioned to obtain overlapped fields of views between such devices 710. In addition to the thermal imaging devices (cameras) individual components, such as, a thermopile may be used to monitor activity and overlay onto a separate camera device such as a cell phone or external video.

The mounting system may use electronic solenoids to pivot the thermal imaging devices 710 in multiple directions to ensure the entire enclosure is monitored. The system is scalable to any enclosure size. A component within the enclosure may be recognized by its particular shape, optical character recognition (OCR) to read the values (serial or label) printed on a component and the calculated location based on the thermal grid temperature recognition system. The grid temperature recognition system will plot coordinates based on the location of the component in the enclosure. These coordinates may be predefined based on internal components and enclosure size or tracked generally. For instance, on a small-sized system that monitor electronic circuit boards, individual small component temperatures may be tracked based on where they reside on the circuit board.

In the invention the thermal imaging devices use a color coded scale to show the heat index of anything within it's field of view. The color coded scale may be used to alert or manage a system 5 if it is determined in accordance with the present invention that a component part of the system 5 falls, or is about to fall, outside of its predetermined or set parameters/thresholds. Software of the invention determines component coordinate information and analyzes the heat value based on the color coded scale. While one or more embodiment are used to detect, measure and monitor heat values, it should be appreciated that the invention is also suitable for use in monitoring cooling events of systems as well. Depending on the scale and size of the enclosure and internal components, the grid may be scaled accordingly to provide detailed coordinates for both large or small objects alike.

In accordance with the various embodiments, the invention provides methods, systems and devices that easily and efficiently operate and function a internationally recognizable operating system control solution for all energy sources to reliably run backup and full power units (homes, apartments, power stations) of all size without all realizing power source problems or failures. The invention advantageously allows a user to utilize a "home backup generator"/"industrial backup generator" or any type of internal combustion engine that on combustion (all fuel sources) uses mechanical movement to create electrical energy. For instance, an oil burner tank (water heater only) and one or more gas fed components (furnace and stove) may be run with oxyhydrogen produced from hydrogen gas generators, with the operation thereof being efficiently monitored, controlled and maintained in accordance with the invention.

The invention is also suitable for use in power sources/implementation systems that operate automobiles. For instance, most automobiles are built not taking into account all the different environment and weather conditions in mind, based on where a user is to operate his automobile. For instance, the same car put all over the world will run differently not only because of normal weather conditions in different areas, but also because of extreme conditions that happen all the time in some areas more then the other. The various embodiments of the invention allow for engine management of automobiles based on environmental (external) conditions, such as, weather, latitude, longitude, and the like. Both home and industrial backup generators, cars etc. are greatly affected by weather because of the sensors controlling these machines, and due to their very small spectrum of data available to them on demand.

The invention allows users to control, adjust, maintain and/or manipulate component parts of operating systems by sensing and taking into consideration various external and/or weather factors and conditions. The invention allows a user to tune a machine/engine on demand due to weather factors would change the definition of efficiency itself. In certain embodiments the software may also include controlled artificial intelligence that is able to inherently and automatically adjust conditions based on learned behaviors and patterns. The invention also does this based sensors/technology detecting weather conditions, patterns, and/or behavior and implementing such detected conditions in the process of controlling and maintaining the power source/implementation systems 5. The invention advantageously makes such power source/implementation systems 5 run more efficiently and cost effectively.

One or more embodiments of the invention utilize secure "Sim cards" based on weather data, weather outlet data, geo mapping and location to provide a user with data parameters of the implementation systems 5, locate the user's and/or system's location, and provide data on power source performance as well as any monetary and/or energy savings. The embodiments of the invention may be performed using a cell phone application.

The instant real-time monitoring and safety system 200 enables the user to visualize and/or be aware of real time/on demand power source operational data. The operating system control for power sources includes hardware and software to work together for achieving optimal power source operation. In various embodiments, one microprocessor may read the sensors while another microprocessor analyzes such data without delay to provide the end user with displayed results. Both internal and external data transmission may be implemented in the invention to provide optimal performance of power source/implementation systems 5.

Again, external and/or environmental data are implemented to provide the efficient, fast and reliable results of the invention of enabling power source/implementation systems 5 to run optimally without failure and/or any deleterious affects. These external and/or environmental data include, for instance, temperature, pressure, humidity, wind, rain fall, snow or any other common weather condition that could effect the efficiency of the combustion of any fuel type that can power everything in your home from a power station, as well as your home outlet.

In the present invention, the combination of hardware, software, sensors, weather reports, specialized server environments, product location tracking and product performance allows the invention to precisely provide the end user with usable data that allows the power source/implementation systems 5 to run efficiently, and at reduced energy and money costs. The combination of hardware in conjunction with product sim card tracing through GPS readers and open source allows external and/or weather information to be received. The invention provides an end user with automated systems that provide proper mapping on demand as well as gather and learn from it through a persistent environment. On demand mapping for all fuels based off the information provided above will reduce performance costs, increase efficiency, and provide efficiently run energy.

Figure 8:
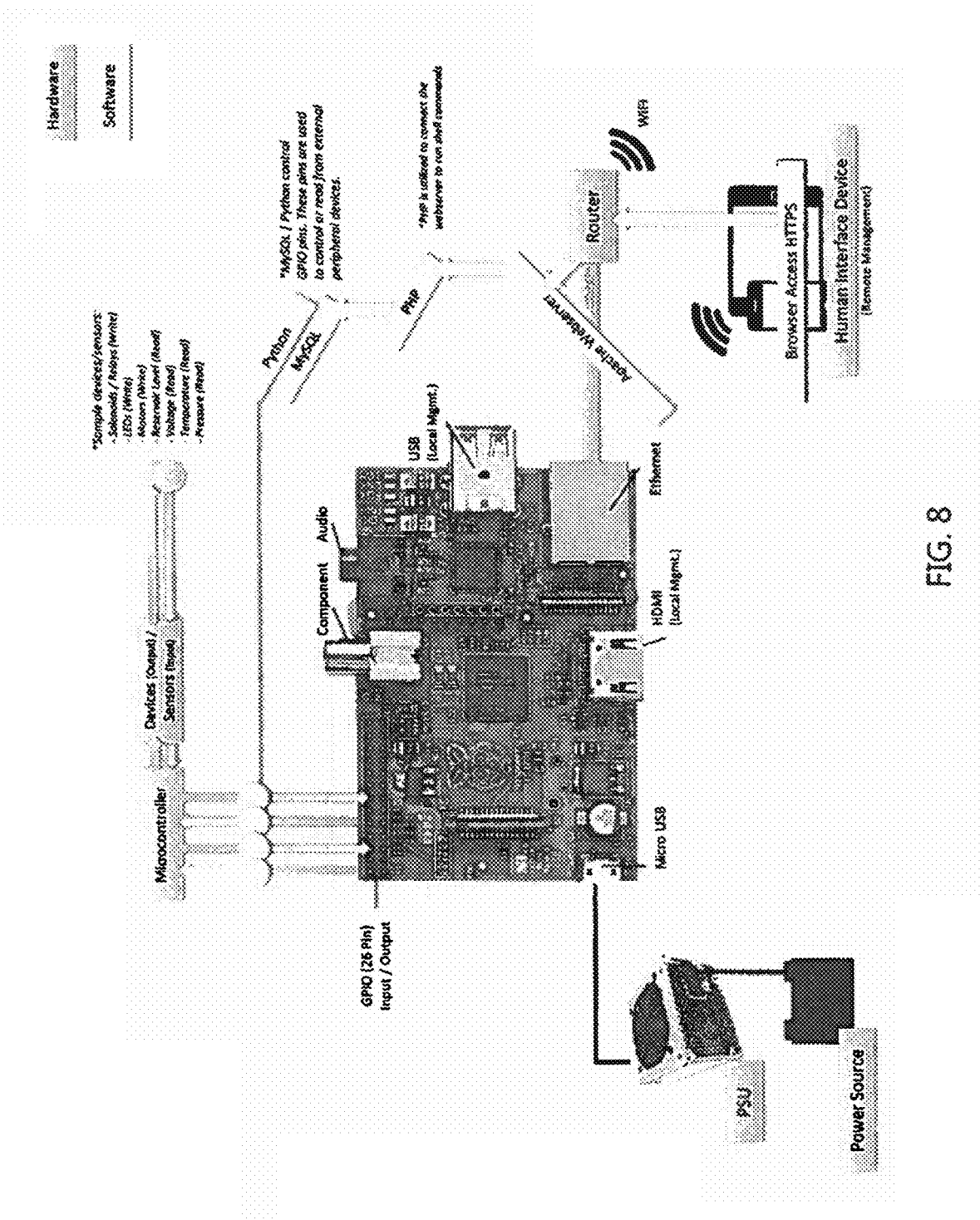
FIGS. 8-12 show exemplary systems, devices and methods in accordance with the one or more embodiments of the invention.
Figure 9:
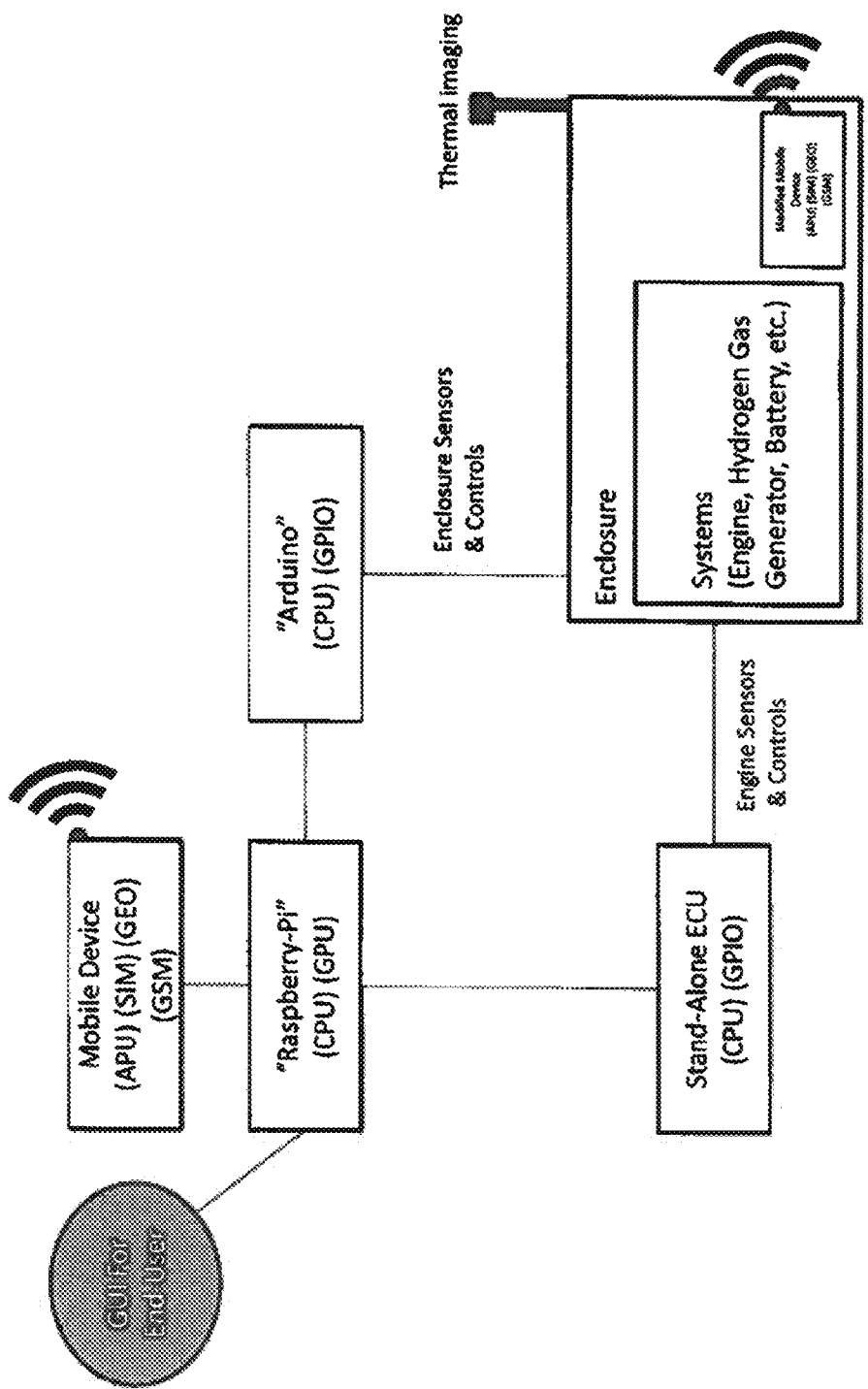
Figure 10:
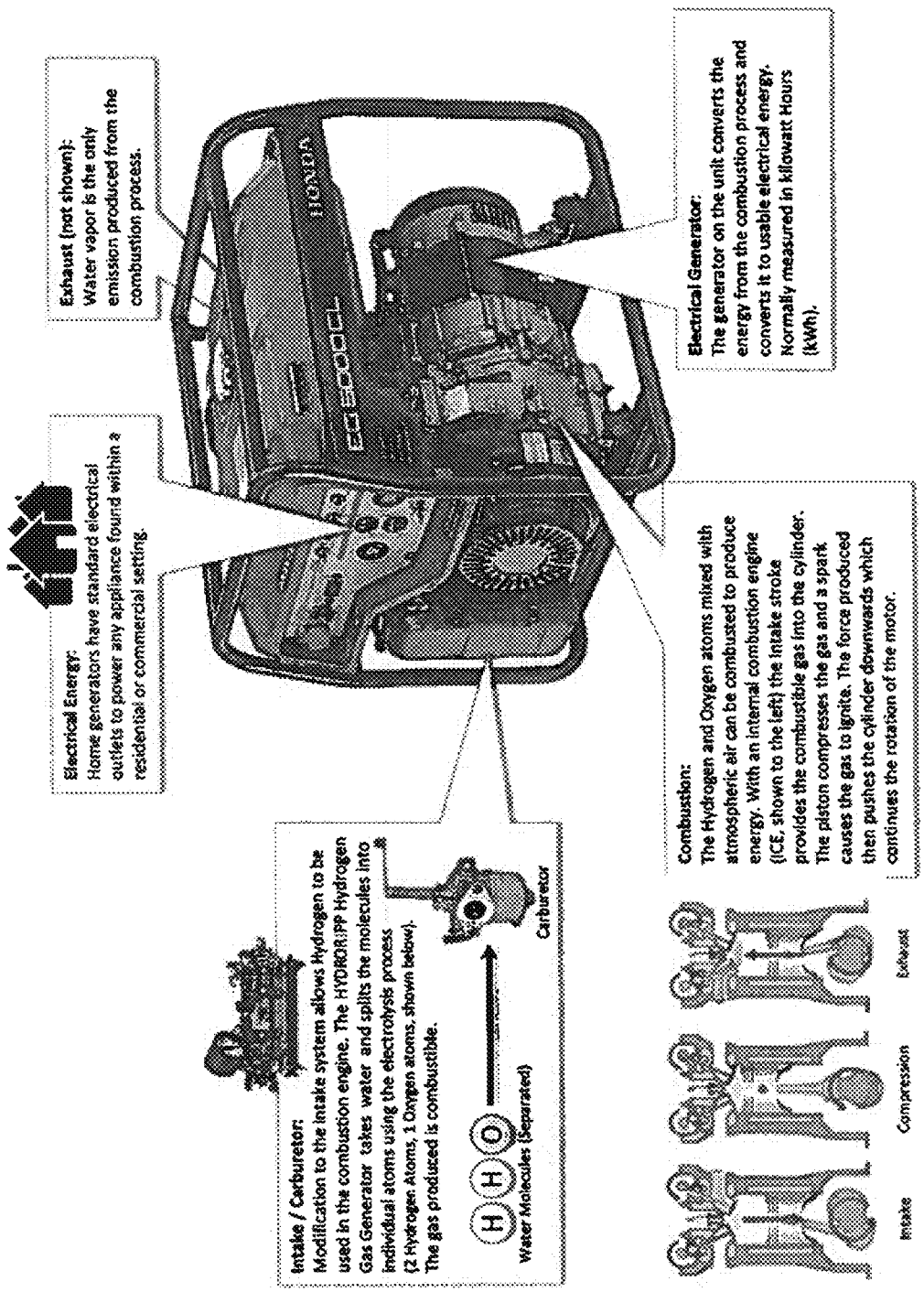
Figure 11:
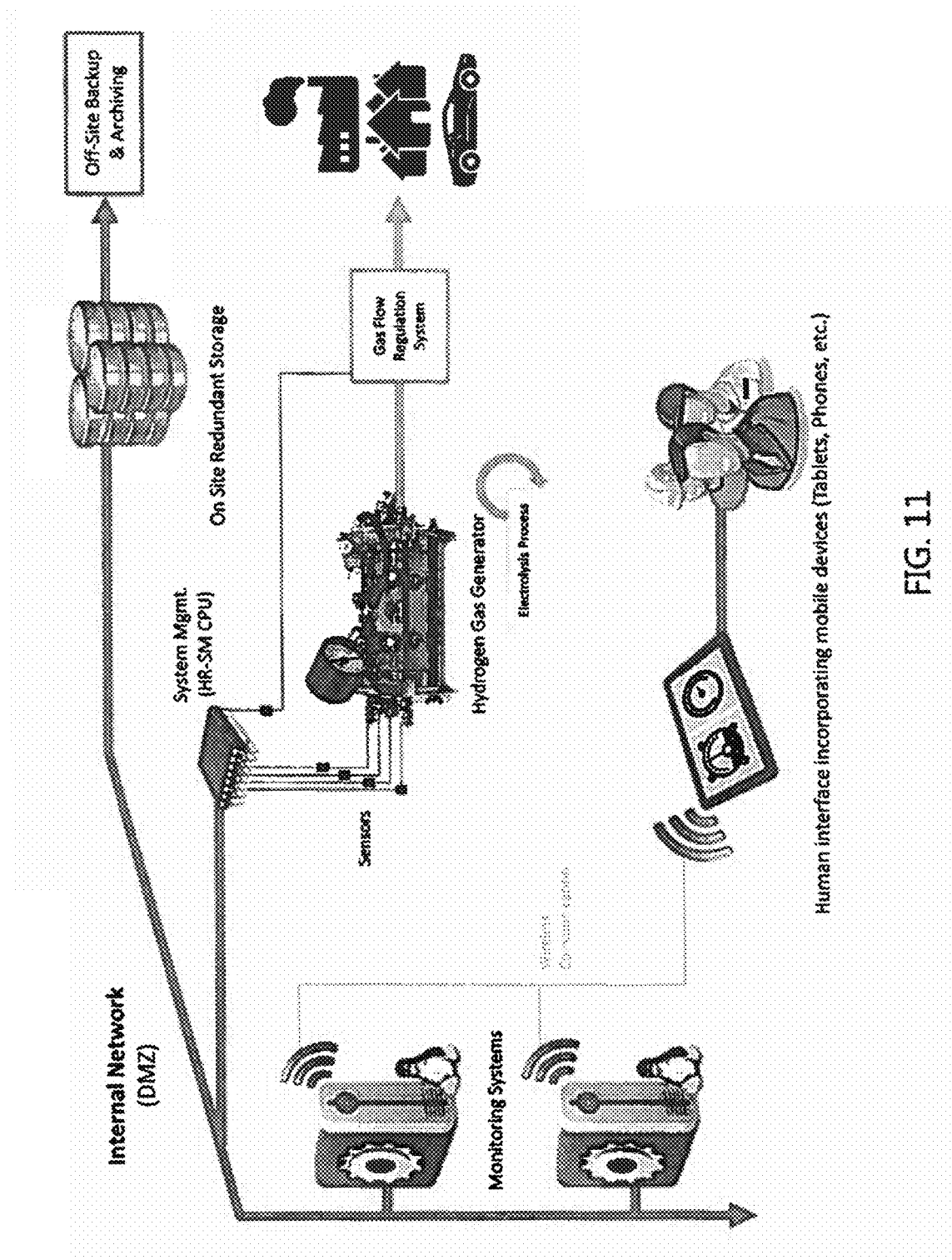
Figure 12:
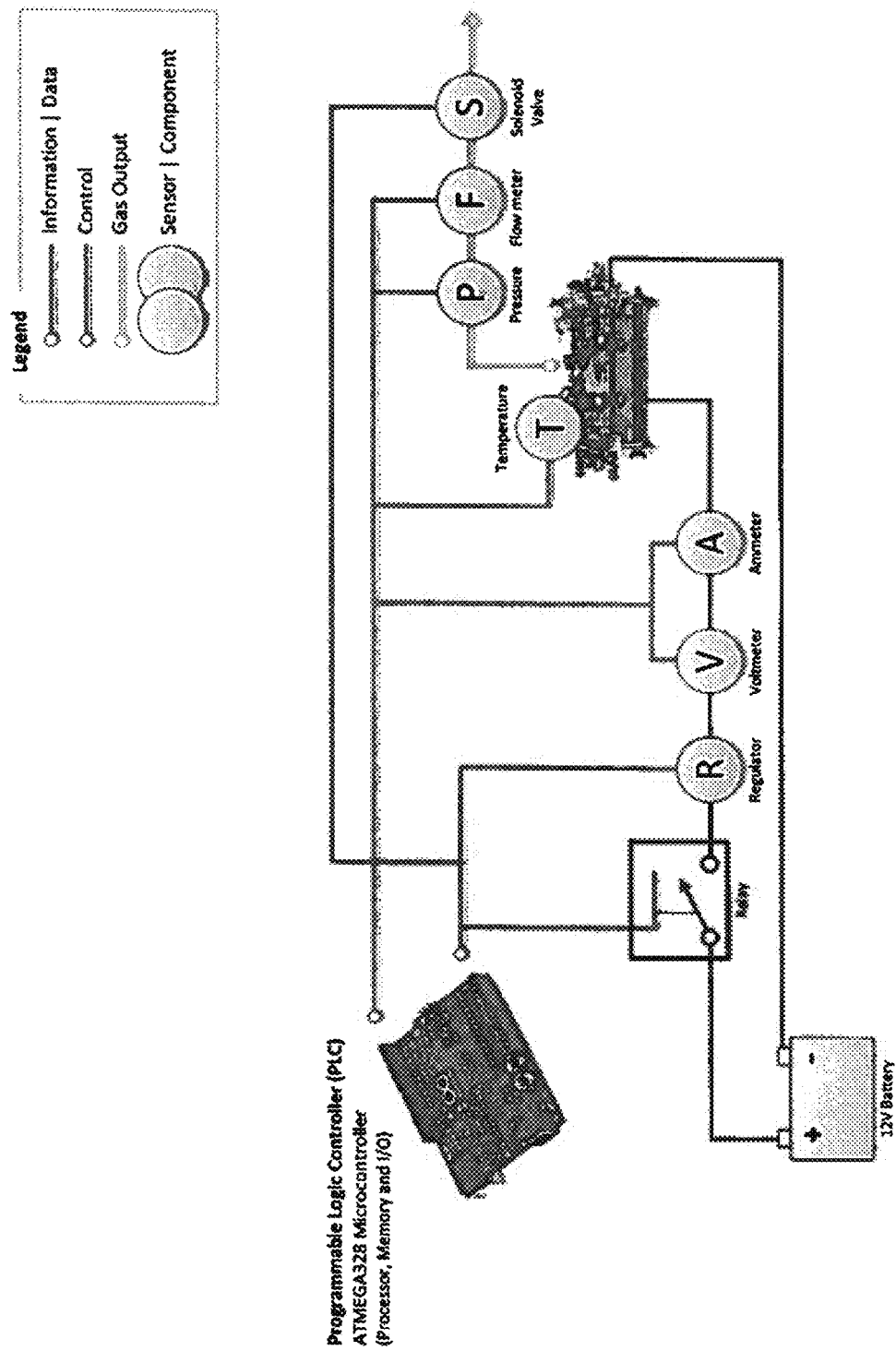

Exemplary systems, devices and methods in accordance with the one or more embodiments of the invention are shown in FIGS. 8-12. FIG. 8 shows an exemplary system management infrastructure of the invention. The various hardware and software components of the invention are depicted work together to provide the beneficial results of the present invention. These systems and methods of the invention may be performed using a mobile device as shown in FIGS. 9 and 11. As such, an end user is able to monitor, control and adjust power source/implementation systems 5 from any location, not just in close proximity to such systems 5. For instance, these systems and methods, whether they are performed on a mobile device or a stationary device, may be utilized to monitor, control and adjust an electrical generator system as shown in FIG. 10. In certain embodiments, the present systems, devices and methods may implement an electronic management system as shown in FIG. 12.

In accordance with the various embodiments of the invention provides monitoring and management of the implementation systems; user(s) (human) interaction between the management and monitoring system(s); monitoring system (s) which may provide automated or manual operation; data management, collection and storage; control and monitor sensor systems) to manage standard and advanced operation and safety parameters; management systems and the intended implementation systems; enclosure system which uses thermal imaging to plot temperature and coordinate data; ability to utilize our natural environment to increase efficiency on machines/synthetic items; specialized server environments to properly manage incoming and out going information; specialized imaging cameras based off heat for advanced analyzing of equipment; video layered with geometric patterns to help aid and create precise OCR scans; product tracking systems to enhance product efficiency as well as customer service; ability to collect data and send data to increase the efficiency of machines on demand, and combinations thereof.

It should be appreciated and understood that the present invention may be embodied as systems, methods, apparatus, computer readable media, non-transitory computer readable media and/or computer program products. The present invention may take the form of an entirely hardware embodiment, an entirely software embodiment (including firmware, resident software, micro-code, etc.) or an embodiment combining software and hardware aspects that may all generally be referred to herein as a "circuit," "module" or "system." The present invention may take the form of a computer program product embodied in one or more computer readable medium(s) having computer readable program code embodied thereon.

One or more computer readable medium(s) may be utilized, alone or in combination. The computer readable medium may be a computer readable storage medium or a computer readable signal medium. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. A suitable computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computing device (such as, a computer), partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

The present invention is described herein with reference to flowchart illustrations and/or block diagrams of methods, apparatus (systems), computer readable media, non-transitory computer readable media, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computing device (such as, a computer), special purpose computing device, or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in the flowchart and/or block diagram block or blocks.

It should be appreciated that the function blocks or modules shown in the drawings illustrate the architecture, functionality, and operation of possible implementations of systems, methods and computer program media and/or products according to various embodiments of the present invention. In this regard, each block in the drawings may represent a module, segment, or portion of code, which comprises one or more executable instructions for implementing the specified logical function(s). It should also be noted that, in some alternative implementations, the functions noted in the block may occur out of the order noted in the figures. For example, the function of two blocks shown in succession may, in fact, be executed substantially concurrently, or the blocks may sometimes be executed in the reverse order, depending upon the functionality involved. It will also be noted that each block and combinations of blocks in any one of the drawings can be implemented by special purpose hardware-based systems that perform the specified functions or acts, or combinations of special purpose hardware and computer instructions. Also, although communication between function blocks or modules may be indicated in one direction on the drawings, such communication may also be in both directions.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A computer-implemented method of controlling and managing power source performance comprising:
providing an operating power source device;
providing one or more sensors to monitor operation of the power source device;
collecting operational data of the power source device via the one or more sensors;
storing operational data of the power source device to both a local and remote database;
analyzing the collected operational data to detect and identify any operational errors of the power source device;
obtaining external environmental factors and internal operating conditions of said operating power source device;
analyze the external environmental factors to identify one or more of said external environmental factors that deleteriously affect performance of the operating power source device; and
correcting for any identified operational errors of the power source device using said external environmental factors and said internal operating conditions, whereby one or more working components of the operating power source device are adjusted to compensate for said identified one or niore of said external environmental factors to maintain optimal performance of the operating power source device.

2. The computer-implemented method of claim 1 further including:
providing a mobile device having geotagging, bluetooth, wireless, wifi and subscriber identity module (SIM);
receiving at the mobile device the identified operational errors of the power source device;
an operations management source not located in the vicinity of the power source device locating and identifying said power source device via the geotagging of the mobile device;
communicate operational information via email, short message service (SMS) and multimedia messaging service (MMS);
remotely correcting the identified operational errors of the power source device via the operations management source.

3. The computer-implemented method of claim 2 wherein the identified operational errors are corrected remotely using the mobile device, or other similar management device (note at top), as a data transfer component for automatically adjusting the identified operational errors.

4. The computer-implemented method of claim 2 wherein the mobile device may be a cell phone, laptop, desktop or microprocessor with integrated mobile components.

5. The computer-implemented method of claim 1 wherein the operating power source device is a generator.

6. The computer-implemented method of claim 5 wherein the generator is a hydrogen gas generator.

7. The computer-implemented method of claim 5 wherein the generator is a diesel operated generator.

8. The computer-implemented method of claim 5 wherein the generator is a natural gas generator.

9. The computer-implemented method of claim 5 wherein the generator is an electrical generator.

10. The computer-implemented method of claim 1 wherein the external environmental factors comprise latitude, longitude, distance above or below sea level.

11. The computer-implemented method of claim 1 wherein the operating power source device is a battery backup system.

12. The computer-implemented method of claim 1 wherein internal operating conditions of said operating power source device includes temperature, runtime, pressure, voltage, flow rate, audio, sound, vibration, thermal conditions and the like.

13. The computer-implemented method of claim 1 wherein the one or more sensors comprise one or more thermal imaging sensors, imaging devices, imaging camera, and combinations thereof.

14. The computer-implemented method of claim 1 wherein one or more of the method steps are implemented in a cloud-computing environment.

15. The computer-implemented method of claim 1 wherein the external environmental factors are external to the operating power source device and comprise weather, latitude, longitude, humidity, atmospheric pressure, temperature, or sea level.

16. The computer-implemented method of claim 15 wherein the internal operating conditions are internal to said operating power source device and comprise internal temperature, pressure, rotation, voltage, amperage, capacitance, or discharge rate.

17. The computer-implemented method of claim 16 wherein the operating power source device is a hydrogen gas generator.

18. The computer-implemented method of claim 1 wherein the external operating conditions, or the internal operating conditions, or the combination of external and internal operating conditions of said operating power source device are obtained on a SIMS card.

19. A non-transitory computer program product for controlling and managing performance of an operating power source device having one or more sensors monitoring operation thereof, the non-transitory computer program product comprising: a non-transitory computer readable storage media;
first program instructions to collect operational data of the power source device via the one or more sensors;
second program instructions to store operational data of the power source device to both a local and remote database;
third program instructions to analyze the collected operational data to detect and identify any operational errors of the power source device;
fourth program instructions to obtain external environmental factors and internal operating conditions of said operating power source device,
fifth program instructions to analyze the external environmental factors to identify one or more of said external environmental factors that deleteriously affect performance of the operating power source device; and
sixth program instructions to correct for any identified operational errors of the power source device using said external environmental factors and said internal operating conditions, whereby one or more working components of the operating power source device are adjusted to compensate for said identified one or more of said external environmental factors to maintain optimal performance of the operating power source device, wherein the first through sixth program instructions are all stored on the non-transitory computer readable storage media.

20. A computer system for controlling and managing performance of an operating power source device having one or more sensors monitoring operation thereof, the computer system comprising:
a central processing unit (CPU), a computer readable memory, and a computer readable storage media;
first program instructions to collect operational data of the power source device via the one or more sensors;
second program instructions to store operational data of the power source device to both a local and remote database;
third program instructions to analyze the collected operational data to detect and identify any operational errors of the power source device;
fourth program instructions to obtain external environmental factors and internal operating conditions of said operating power source device,
fifth program instructions to analyze the external environmental factors to identify one or more of said external environmental factors that deleteriously affect performance of the operating power source device; and
sixth program instructions to correct for any identified operational errors of the power source device using said external environmental factors and said internal operating conditions, whereby one or more working identified one or more of said external environmental factors to maintain optimal performance of the operating power source device, wherein the first through sixth program instructions are all stored on the computer readable storage media.

\* \* \* \* \*